(12) United States Patent
Bajpai et al.

(10) Patent No.: US 8,484,651 B2
(45) Date of Patent: Jul. 9, 2013

(54) DISTRIBUTED PRIORITY QUEUE THAT MAINTAINS ITEM LOCALITY

(75) Inventors: Ratan Bajpai, Mt. Laurel, NJ (US); Krishna Kishore Dhara, Dayton, NJ (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1293 days.

(21) Appl. No.: 12/115,031

(22) Filed: May 5, 2008

(65) Prior Publication Data

US 2008/0276241 A1 Nov. 6, 2008

Related U.S. Application Data

(60) Provisional application No. 60/916,171, filed on May 4, 2007.

(51) Int. Cl.
 *G06F 13/18* (2006.01)
(52) U.S. Cl.
 USPC ............................................. 718/103
(58) Field of Classification Search
 None
 See application file for complete search history.

(56) References Cited

U.S. PATENT DOCUMENTS

| | | | |
|---|---|---|---|
| 5,243,607 A * | 9/1993 | Masson et al. | 714/49 |
| 5,471,397 A * | 11/1995 | Hsieh et al. | 716/115 |
| 6,003,101 A * | 12/1999 | Williams | 710/112 |
| 6,381,605 B1 * | 4/2002 | Kothuri et al. | 1/1 |
| 7,403,941 B2 * | 7/2008 | Bedworth et al. | 1/1 |
| 7,761,350 B1 * | 7/2010 | Ridgeway | 705/30 |
| 7,925,756 B1 * | 4/2011 | Riddle | 709/226 |
| 2002/0194250 A1 * | 12/2002 | Hsieh | 709/103 |
| 2004/0064475 A1 * | 4/2004 | Maeda et al. | 707/103 Y |
| 2004/0083468 A1 * | 4/2004 | Ogawa et al. | 717/151 |
| 2004/0154006 A1 * | 8/2004 | Heishi et al. | 717/140 |
| 2005/0289551 A1 * | 12/2005 | Wojtkiewicz et al. | 718/103 |
| 2006/0080285 A1 * | 4/2006 | Chowdhuri | 707/3 |
| 2007/0047528 A1 * | 3/2007 | Croak et al. | 370/356 |

OTHER PUBLICATIONS

Yoshikawa, C; Chun, B.N.; Vahdat, A; "Distributed Hash Queues: Architecture & Design," in *Lecture Notes in Computer Science*, Springer-Berlin, vol. 3601/2005, 2005 pp. 28-39.

Raymond Kerry, "A Tree-Based Algorithm for Distributed Mutual Exclusion", *ACM Transactions on Computer Systems*, vol. 7, No. 1, Feb. 1989, pp. 61-77.

Mans, Bernard, "Portable Distributed Priority Queues with MPI", *Concurrency-Practice and Experience* 10(3): 175-198 (1998).

(Continued)

*Primary Examiner* — Eric Coleman
(74) *Attorney, Agent, or Firm* — Muncy, Geissler, Olds & Lowe, PLLC

(57) ABSTRACT

A method of administering a distributed priority queue structure that includes removing a highest priority item from a current root node of a tree structure to create a temporary root node, determining for each subtree connected to the temporary root node a subtree priority comprising the priority of the highest priority data item in the each subtree, determining as the highest priority subtree connected to the temporary root node the subtree connected to the temporary root node having the highest subtree priority, determining whether any of the one or more data items stored at the temporary root node has a higher priority than the highest subtree priority and directing an arrow to the subtree having the highest priority or to the temporary root itself if the priority of the data items stored at temporary root is higher than the priorities of the connected subtrees.

27 Claims, 7 Drawing Sheets

OTHER PUBLICATIONS

Lee, H. and Welch, J. "Randomized Shared Queues Applied to Distributed Optimization Algorithms", *Annual ACM Symposium on Principles of Distributed Computing, Proceedings of the Twentieth Annual ACM Symposium on Principles of Distributed Computing*, 2001, pp. 311-313.

Demmer et al., "The Arrow Distributed Directory Protocol", *Lecture Notes in Computer Science, Proceedings of the 12th International Symposium on Distributed Computing*, Springer Verlag Berlin Heidelberg 1998, pp. 119-133.

* cited by examiner

DISTRIBUTED PRIORITY QUEUE THAT MAINTAINS ITEM LOCALITY

CROSS-REFERENCE TO RELATED APPLICATIONS

The present application claims the benefit of U.S. Provisional Patent Application No. 60/916,171, filed May 4, 2007, the entire contents of which is hereby incorporated by reference.

FIELD OF THE INVENTION

The present invention is directed to a method and apparatus for administering a distributed priority queue that maintains item locality, and, more specifically, toward a method and apparatus for administering a distributed priority queue in the form of a tree having a plurality of directed edges or pointers, one of the pointers pointing from a first node to a subtree of the first node that stores a data item having a priority higher than the priority of any data item stored at the first node.

BACKGROUND OF THE INVENTION

Distributed systems have evolved from highly parallel, structured and homogeneous systems to flexible, highly scalable, and heterogeneous systems. These systems communicate via message passing and may not assume a regular network architecture. Peer-to-peer (P2P) content sharing networks and other P2P voice networks are examples of such irregular distributed multi-computer systems. Highly optimized distributed data structures and algorithms have been developed for various distributed systems. However, the applicability of such data structures and algorithms, which are suitable for traditional distributed systems, needs to be revisited in the context of modern distributed systems such as distributed priority queues (DPQs). A DPQ is a fundamental data structure used in a variety of distributed applications.

Typically, distributed algorithms focus on optimal schemes to parallelize or distribute classic algorithms. In the case of DPQs, several algorithms have been developed to parallelize or distribute the heap-based priority queue data structure. These algorithms, however, do not preserve the locality of item; that is, items may be moved from node to node when the DPQ is re-heapified. It is also often necessary to know the number of nodes in a distributed system in order to map a DPQ algorithm. Furthermore, in many minHeap based DPQ algorithms, the root node becomes a processing bottleneck. These issues are not desirable for several modern distributed applications such as the distributed call center example described below.

A distributed call center application consists of loosely connected distributed agent nodes that can receive and service calls from external users. Agent nodes place the calls in a queue and start servicing them by an automated interactive voice response (IVR) system. Calls have to stay on the agent node at which they arrive, and associated data is generated while the calls are serviced. These queued calls that are being serviced can only be interrupted by the next available agent, which removes the head of the queue and answers the associated call. DPQ algorithms that move items from node to node each time an item is added or removed from the queue are not suitable for implementing such a call center. Such systems would benefit from a method of administering a queue that allows items to remain on arriving nodes, that maintains a global logical queue that is distributed across the network, and that does not have a bottleneck on any single node.

A priority queue is formally defined as an ordered set of items where any item i consists of the pair (Weighti, Recordi). Here Weighti is typically a numerical value which determines the priority of an item in the queue, and Recordi is the data associated with the item. Two basic operations that can be performed on a priority queue are: 1) insert, which inserts a new item i with a predefined priority Weighti into the priority queue and 2) deleteMin, which removes the item with highest priority or minimum weight (head of the queue) from the queue and returns it. (The phrases "item with minimum weight," "item with highest priority" and "head of the queue" are used interchangeably hereinafter).

Each node stores a list of items, and collectively the nodes form a logical distributed queue. The insert or deleteMin requests can come to any node and in any order independent of other requests. There are several challenges to realizing a DPQ in such loosely coupled message passing networks, and among these is the fact that queue items are distributed across different nodes. Due to the lack of any specific architectural connection between nodes, it is difficult to track the head of the queue. Another challenge in these systems is that the deleteMin and insert operations can happen at any node in real-time. The DPQ framework should preserve priority order under such operations. Without any assumptions on the architecture, prediction of results of such concurrent operations is difficult. On the contrary, waiting to synchronize these operations through serialization is expensive and not scalable. DPQ algorithms in such systems should find a way to localize the effects of these operations but still maintain the logical DPQ.

SUMMARY OF THE INVENTION

These problems and others are addressed by embodiments of the present invention, a first aspect of which comprises a method of administering a distributed priority queue structure. The distributed priority queue structure comprises a tree having nodes storing one or more data items having a priority, and the node storing a data item with a highest priority in the tree is called the current root node. At least one pointer points to the current root node. Each node connected directly to a given node comprises a subtree node of the given node, and all nodes connected to the given node through the subtree node comprise a subtree of the given node. The method includes removing the highest priority item from the current root node to create a temporary root node, determining for each subtree connected to the temporary root node a subtree priority comprising the priority of the highest priority data item in the each subtree and determining as the highest priority subtree connected to the temporary root node the subtree connected to the temporary root node having the highest subtree priority. The method further comprises determining whether any of the one or more data items stored at the temporary root node has a higher priority than the highest subtree priority, and, if any of the one or more data items stored at the temporary root node has a priority higher than the highest subtree priority, defining the temporary root node as the current root node. If none of the one or more data items stored at the temporary root node has a priority higher than the highest subtree priority, the direction of the pointer between the temporary root node and the highest priority subtree is changed to point to the subtree node of the highest priority subtree, and the subtree node of the highest priority subtree is defined as the new temporary root node.

Another aspect of the invention comprises a method of administering a distributed priority queue structure that comprises a tree having nodes storing one or more data items having a priority. In the tree, each node connected directly to a given node is a subtree node of the given node, and all nodes connected to the given node through the subtree node are a subtree of the given node. The priority of a given subtree is the priority of the highest priority data item stored on a node in the given subtree. The method involves, for a first node, providing a pointer pointing to a subtree node of a subtree of the first node having a higher priority than the priorities of the one or more data items stored at the first node, and, if no subtree connected to the first node has a priority higher than the priorities of the one or more data items stored at the first node, defining the first node as the root node.

Still another aspect of the invention comprises an apparatus for administering a distributed priority queue structure that comprises a tree having nodes storing one or more data items having a priority. The node storing a data item with a highest priority in the tree is called a current root node, and a plurality of pointers point from a first node to a second node or from the first node to the first node. Each node connected directly to a given node is a subtree node of the given node, and all nodes connected to the given node through the subtree node are a subtree of the given node. The apparatus includes a weight table storing weights for each subtree of each node in the tree, a mechanism for changing the direction of the plurality of pointers, a mechanism for removing the highest priority data item from the tree, a mechanism for inserting a new data item into the tree, and a mechanism for updating the weight table when the highest priority item is removed from the tree and when a new data item is inserted into the tree.

A further aspect of the invention comprises a computer readable recording medium storing a program for causing a computer to perform a method of administering a distributed priority queue structure. The distributed priority queue structure comprises a tree having nodes storing one or more data items having a priority in which one of the nodes storing a data item with a highest priority in the tree comprises a current root node. At least one pointer points to the current root node, each node connected directly to a given node comprises a subtree node of the given node, and all nodes connected to the given node through the subtree node comprise a subtree of the given node. The method includes removing the highest priority item from the current root node to create a temporary root node, determining for each subtree connected to the temporary root node a subtree priority comprising the priority of the highest priority data item in the each subtree, and determining as the highest priority subtree connected to the temporary root node the subtree connected to the temporary root node having the highest subtree priority. The method also includes determining whether any of the one or more data items stored at the temporary root node has a higher priority than the highest subtree priority, and, if any of the one or more data items stored at the temporary root node has a priority higher than the highest subtree priority, defining the temporary root node as the current root node. If none of the one or more data items stored at the temporary root node has a priority higher than the highest subtree priority, the method includes changing the direction of the pointer between the temporary root node and the highest priority subtree to point to the subtree node of the highest priority subtree, and defining the subtree node of the highest priority subtree as the new temporary root node.

BRIEF DESCRIPTION OF THE DRAWINGS

These aspects of embodiments of the invention and others will be better understood after a reading of the following detailed description together with the accompanying drawings wherein.

DETAILED DESCRIPTION

Figure 1:
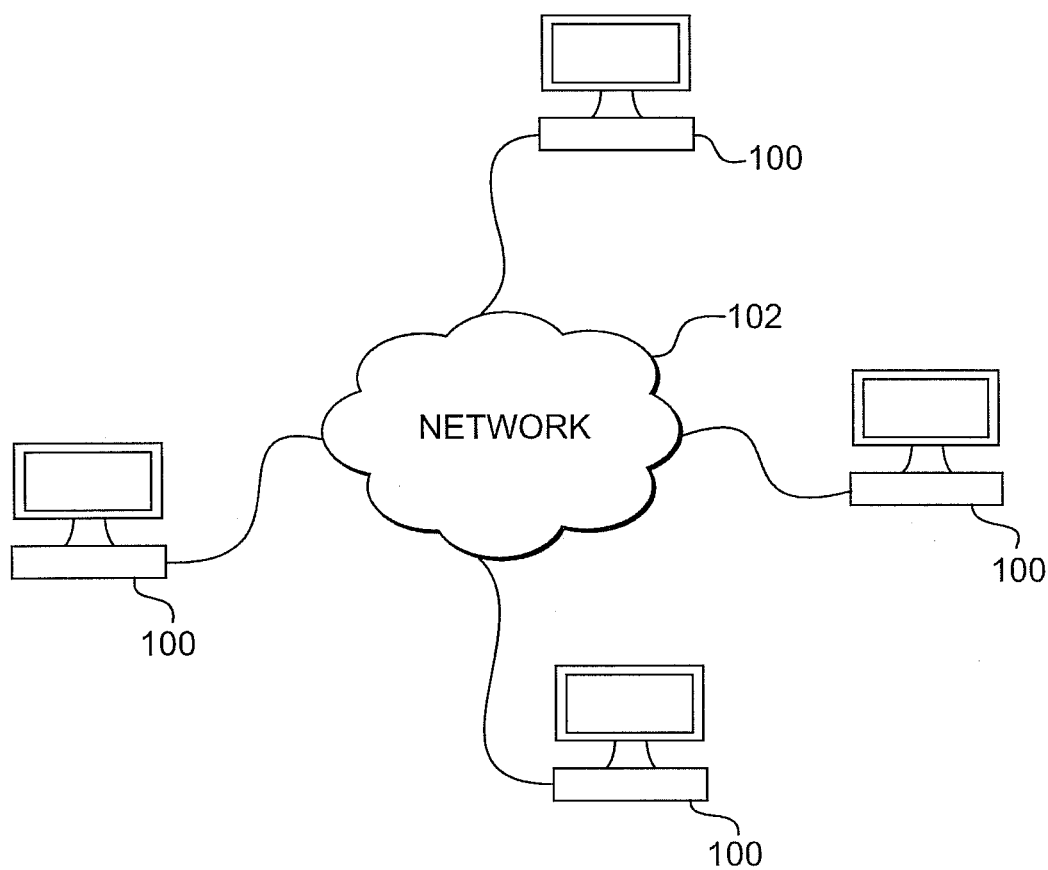
FIG. 1 illustrates a plurality of computers connected to a network for administering a distributed priority queue according to an embodiment of the present invention.

Referring now to the drawings, wherein the showings are for purposes of illustrating preferred embodiments of the invention only and not for the purpose of limiting same, FIG. 1 illustrates a plurality of general purpose computers 100 connected via a network 102 (which may comprise the internet) which computers administer a distributed priority queue according to an embodiment of the present invention and may comprise servers handling calls in a call center. One or more of these general purpose computers 100 are programmed as special purpose computers for carrying out the algorithm described hereinbelow.

Figure 2:
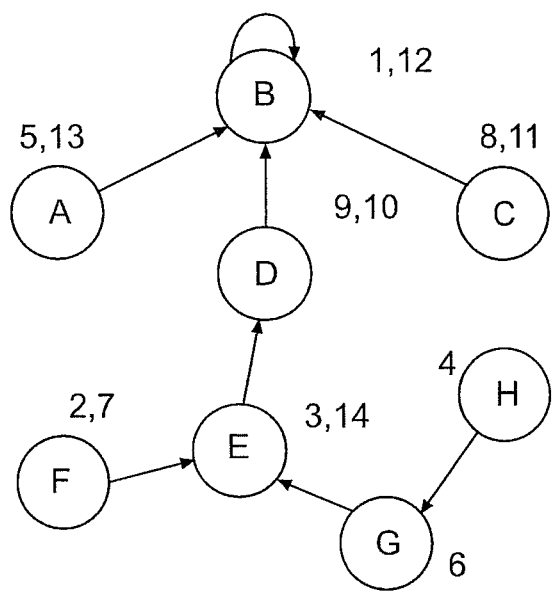
FIG. 2 is a tree structure of a distributed priority queue according to an embodiment of the present invention.

FIG. 2 illustrates a message passing network as a connected graph G, where each vertex is a reliable node (labeled a-h) and each edge is a reliable bi-directional FIFO communication link. This representation makes no assumptions regarding the underlying network architecture. The nodes communicate along a network spanning tree T in G. A minimum spanning tree is preferable in terms of communication costs, but it is not required. Any network spanning tree is sufficient for this purpose, and such a network spanning tree may be referred to hereinafter as a tree T.

Each of the nodes in the tree stores one or more data items having weights that represent the priority of the associated data items. The priorities of the data item or items stored at each node are listed next to each node in FIG. 2; the highest priority data item is identified by numeral 1 and the lowest priority item is identified by reference numeral 12. In this arrangement, low numbers represent high priorities. Typically these weights are based on the time when an item is inserted into the tree, and this provides a simple first-in-first-out (FIFO) queuing behavior. The weights can also be functions of different variables such that the DPQ can be prioritized based on a combination of several parameters. Thus, data added at a given time may have a priority higher than that of data that was previously added to the queue if the more recently added data comes from a higher priority source (from a customer paying a premium for faster responses, for example).

Each of the nodes a-h can represent, for example, a server in a call center at which telephone calls are received. Data concerning telephone calls comprises the data stored locally at each node, and the priority of each call is based on the time the call was received. In FIG. 2, it can be seen that the highest priority call (with a priority of 1) is stored at node, a and the second highest priority call (priority 2) is stored at node f.

When an item is inserted into a local queue at a node, it is stored locally on that node itself until it gets deleted from the queue. An item is inserted into a given node using an "insert" command. The highest priority item is removed from the DPQ using a "deleteMin" command. Certain steps are performed with each insert command to ensure that the inserted item is properly represented in the queue and becomes part of the DPQ. Likewise, when the head of the queue (the highest priority item) is removed from the queue, the new head of the queue must be located. Moreover, the insert and deleteMin operations can be carried out concurrently at any node in T.

When a deleteMin operation is performed on any network node, a query is sent out to locate the head of the logical DPQ. Once the location of the head is determined, the head is removed from the node where it was stored and is returned to the querying node. The present system starts with a given rooted tree which can have an arbitrary node chosen as root. As insert and deleteMin operations are performed, the rooted tree is maintained such that the root always contains the head of the DPQ. To achieve this, at any instant, each node in the network has an arrow (pointer) pointing in the direction of the head of the queue. The arrow at a node can either point to itself or to one of its adjacent nodes in T. If the arrow points to itself, as at node b in FIG. 2, the head of the queue is stored locally on that node, and that node is the root of the tree. If the arrow points to an adjacent node, then the head of the queue is stored in a sub-tree containing the adjacent node. In this way any node can locate the head of the queue by traversing the tree in the direction of arrows. At any node, there will be zero or more incoming arrows and exactly one arrow either pointing to itself or going out from the node. The arrows are essentially directed edges of the rooted tree, and they always point in the direction of root node.

The location of the root node might change after an insert or a deleteMin operation is performed. As a result, some of the arrows (directed edges) in T must be re-oriented to point toward the new root. To determine the direction of arrow between any two adjacent nodes in T, the weights of the subtrees attached to a given node must be considered.

Figure 3:
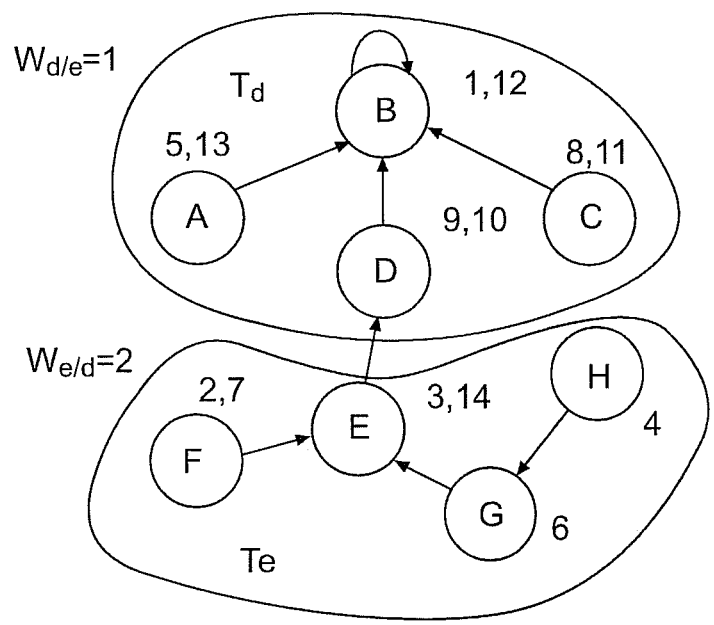
FIG. 3 is the tree structure of FIG. 2 separated into first and second subtrees.

FIG. 3 illustrates a manner of determining the direction of the arrow between nodes d and e. Node e has three subtree nodes (f, e and g), that is, nodes connected directly to node e. Each of the nodes in the tree in turn has a weight, as shown in Table 1.

TABLE 1

| Node | Subtree | Weight | Parent |
|------|---------|--------|--------|
| e | $W_e$ | 3 | |
| d | $W_{d/e}$ | 1 | x |
| f | $W_{f/e}$ | 2 | |
| g | $W_{g/e}$ | 4 | |

The weight of node e itself, designated $W_e$ in this example is 3 because the highest priority item stored in node e has a priority of 3. The weight of the subtree containing node f, designated $W_{f/e}$, is 2 because the highest priority item stored in subtree f has a priority of 2. Note in this case, subtree f is a one-node subtree consisting of node f itself. The weight of subtree g, designated $W_{g/e}$, is 4 because the highest priority item stored in subtree g (consisting of nodes g and h) is the item stored at node h having a priority of 4. Finally, the weight of subtree d, designated $W_{d/e}$, is the weight of the highest priority item stored in subtree d and that item, stored at node b, has a priority of 1. The weights of all data items stored on all nodes are stored in a similar manner, and the arrows between nodes are arranged so that the arrow leaving a particular node points to a node in a subtree having a higher priority than any other subtree or the node itself. If a node stores an item having a priority higher than the priorities of all attached subtrees, that node is the root and will have an arrow pointing to itself.

Formally, two adjacent nodes u and v may be considered. If the edge between u and v is removed, T is divided in two subtrees, $T_u$ and $T_v$. The weight of subtree $T_u$ without the edge (u, v), denoted by $W_{u\backslash v}$, is the minimum of weights of all items stored on the nodes in $T_u$ (without regard for items for which insert is not complete and that are still in transition). Likewise the weight of subtree $T_v$ without the edge (u, v), denoted by $W_{v\backslash u}$, is the minimum of weights of all items stored on the nodes in $T_v$. Therefore, for a tree $T=(V_T, E_T)$, for any node u that is an element of $V_T$, $W_u$ is the minimum of weights of all the items stored locally at node u. Wu\v is the minimum of $W_u$, and all weights $W_{x\backslash u}$ reported by adjacent nodes {x} such that (x, u) is an element of $E_T$ and x≠v.

Each node u in T receives values of $W_{x\backslash u}$ from all adjacent nodes x in VT and stores them in its weights table. This weights table is used to determine the parent of u. Note that a value $W_{x\backslash u}$ may not represent minimum of weights of all items currently stored in x's subtree. This is because there might be pending operations in x's subtree that have not yet been reported to node u. The maximum size of a weights table is bounded by the maximum degree of nodes in T. During initialization of a weights table, each weight entry can be set to Wmax, where Wmax is some global maximum over a domain of possible weight values. As items are inserted and deleted in the DPQ, they will have higher priorities than Wmax, and the values in the weights table will change accordingly. Also since the tree is initially rooted, the Parent column in the weights table will have exactly one node marked as parent at all times after initialization.

According to embodiments of the present invention, tree T must be maintained as a rooted tree with its head stored at the root node. To accomplish this task, some nodes have to select a new parent when the head is removed. For selecting a parent, a node looks at its updated weights table and chooses an adjacent node with the minimum weight in the table. This ensures that the selected parent node points in the direction of a root that stores the head of the DPQ. For example, node e determines that Wd\e has the minimum weight and therefore selects d as the parent node as shown by the arrow pointing from node E to node D in FIG. 3. Note that for simplicity, it is assumed that inserted items have unique weights. However, if this is not the case, a secondary key such as a node identifier can be used to break the tie between item weights. A node can point to itself if the highest priority item is locally stored on that node. For example, node b has a weight of $W_b$ of 1, $W_{a\backslash b}$ of 5, $W_{d\backslash b}$ of 2, and $W_{c\backslash b}$ of 8. From this table, node b can compute its parent and point to it, which is itself as shown in FIG. 3.

When a deleteMin command is issued, the command travels in the direction of the arrows until it reaches the head of the DPQ. In the present example, the command would reach node b, recognize that node b points to itself and therefore stores the highest priority item in the queue, and remove the item with priority 1 from node b. This action necessitates an update to the weights table of b and a possible realignment of arrows.

Figure 4:
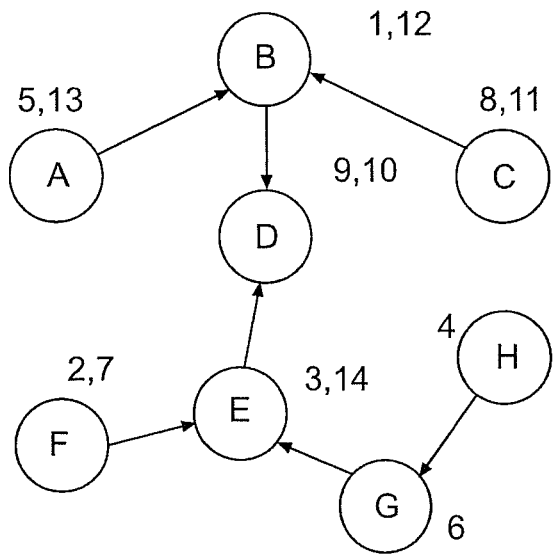
FIG. 4 is the tree structure of FIG. 2 after the head of the queue has been removed.

When the item having priority 1 is removed from node b, the weight of node b, $W_b$, becomes 12. Weight $W_{d\setminus b}$, however, is 2 because the subtree connected to node b via node d includes an item having a priority of 2. As illustrated in FIG. 4, the arrow leaving node b no longer points to node b, but rather points from node b to node d.

Figure 5:
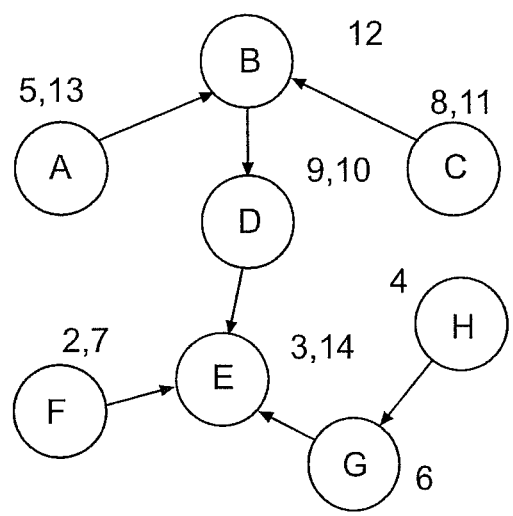
FIGS. 5-7 are the tree structure of FIG. 4 at various updating stages after the head has been removed from the distributed priority queue.
Figure 6:
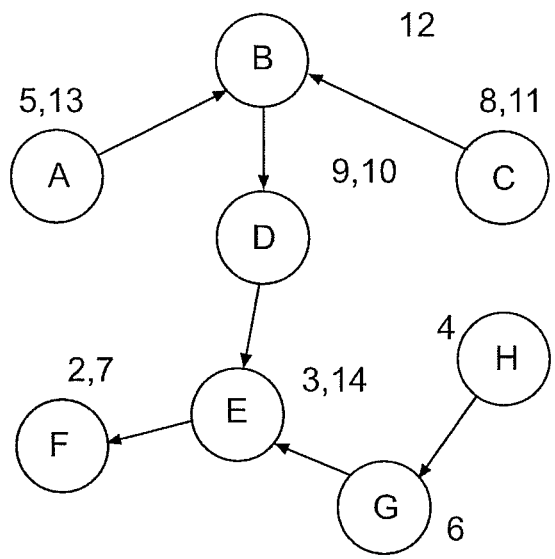
Figure 7:
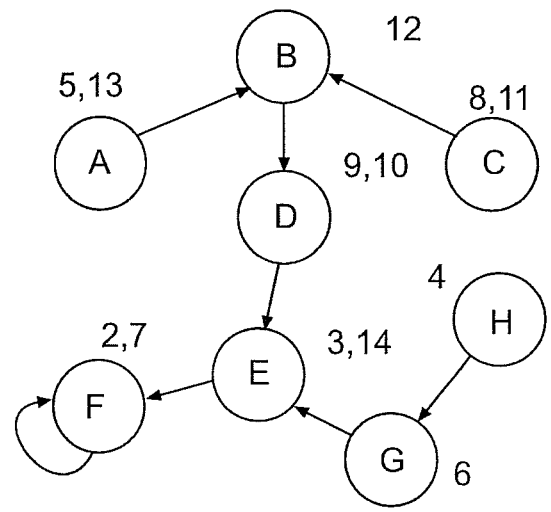

It must thereafter be determined whether node d holds the head of the queue or whether the direction of the arrow leaving node d must also be changed. The weight table of node d is updated to reflect a weight $W_{b/d}$ of 5 (the highest priority item in the subtree connected via node b), and a weight $W_{e/d}$ of 2. The fact that the highest priority subtree can be reached via node e causes the arrow leaving node d to point to node e as illustrated in FIG. 5. The weights table of node e is then updated. Weight $W_{d/e}$ is 5, weight $W_{f/e}$ is 2 and weight $W_{g/e}$ is 4. The arrow leaving node e is therefore oriented to point to node f as illustrated in FIG. 6. Finally, the weights table of node f is updated to show that the weight of node f, $W_f$, is 2 which is lower (higher priority) than the weight $W_{f/e}$ of 3, and an arrow is then added from node f to node f to show that node f is the new root of the tree as illustrated in FIG. 7.

Note that the weights tables of some of the nodes, such as nodes c and h were not updated during this process. However, these nodes still point to subtrees having higher priorities, and thus a deleteMin request arriving at node h, for example, would still traverse the tree and reach the current root.

Formally, it can be stated that each node selects a parent that is located in the direction of the head of the tree. For this purpose, each node has to satisfy an invariant which guarantees that its parent's weights table has the right information to point towards the head. This property is described as node invariant and is defined as follows.

Node Invariant ($I_v$): For a rooted tree T, with $V_T$ vertices and $E_T$ directed edges, if v is an element of $V_T$ then $I_v$ is defined in Equation 1 as:

$$W_{v\setminus parent(v)} = \text{Min of} \begin{cases} W_v \\ W_{x\setminus v}, & \forall x \in V_T \cdot ((v,x) \in E_T) \\ & \wedge (parent(x) = v) \end{cases} \quad (1)$$

The above invariant indicates that the subtree weight which a node v reports to its parent is always a minimum of $W_v$ and the subtree weights received from all of v's children. This node invariant is similar to a min-heap invariant, except that in a min-heap based priority queue, the invariant is on item weights, whereas the node invariant is on subtree weights which eventually is a function of item weights.

Insert Operation

Figure 8:
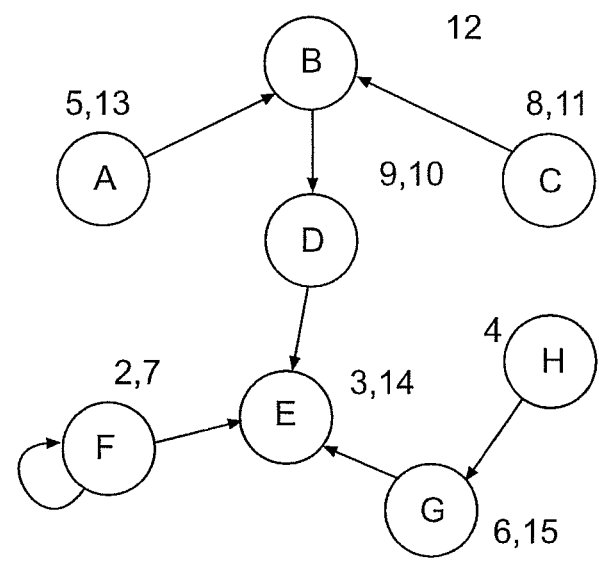
FIG. 8 is the distributed priority queue of FIG. 7 with a first new data item added at node g.

The insertion of a new item into the tree is now is described with respect to FIG. 8 which illustrates an item having a priority of 15 being inserted at node g. Prior to the insertion of the new item, the value $W_g$ was 6, and $W_g$ remains 6 after the insertion of the new item. Moreover, $W_{h/g}$ remains 4 and $W_{e/g}$ remains 2. Therefore, no changes in the direction of the arrows between nodes is required and no updates are required at the other nodes.

Figure 9:
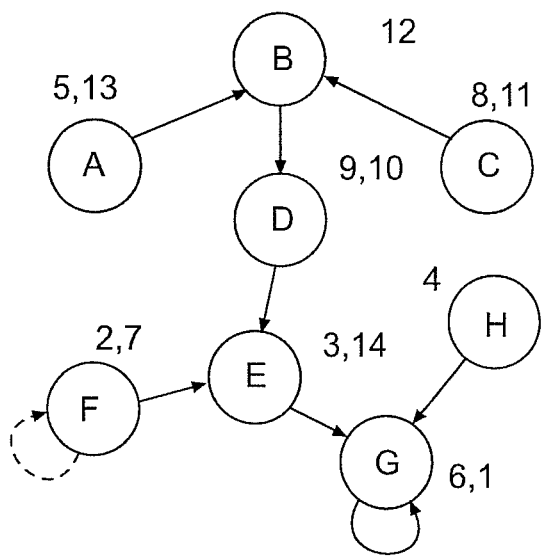
FIG. 9 is the distributed priority queue of FIG. 7 with a second new data item added at node g.

FIG. 9 illustrates the insertion of an item having a priority of 1 at node g. The weights table of node g is updated to reflect that $W_g$ is 1, the weight of $W_{h/g}$ is 4 and $W_{e/g}$ is 2, the lowest weight in the subtree connected to node g via node e. This change in the weights table of node g causes an update to the weights tables of g's parent, node e, and the weights table of node e is updated to show $W_{d/e}$ remains 5, $W_{f/e}$ is 2 and $W_{g/e}$ is 1. The weights table of node e's parent, node f, is updated to reflect that $W_{f/e}$ is 1, and the arrow between nodes f and e is oriented to point toward node e, the arrow from node e is reoriented to point to node g, and the arrow pointing from node f to node f is removed. Since the priority of the data item stored at node g, 1, is lower than the priorities of the subtrees connected to node g, an arrow pointing from node g to node g is also added to indicate that node g is the new root. Only the weights tables of nodes g, e and f are updated in this case. The weights tables of the remaining nodes are now out of date. However, these nodes still point generally toward the root and will allow the root to be located when data items are added at other nodes. As data items are added to other nodes, the nodes between the location of the newly added data item and the root will also be updated. Updating only limited numbers of nodes with each addition and removal of data items decreases processing time and increases efficiency.

Figure 10:
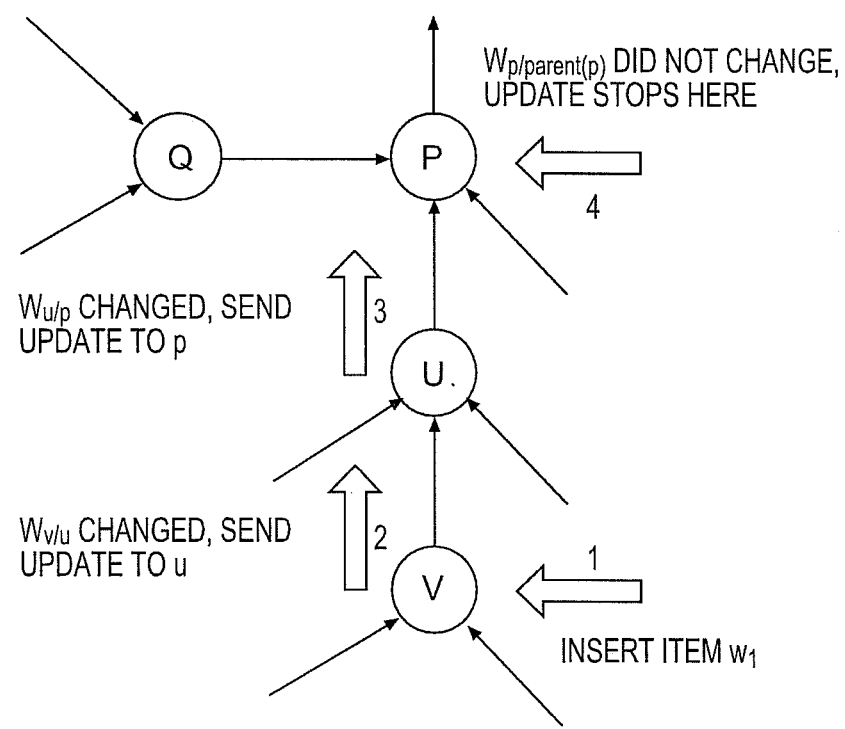
FIG. 10 is a tree structure illustrating update propagation during an insert operation.

Formally, and more generally, the insert operation can be described as follows, with reference to FIG. 10. When a new item with weight wi is inserted at a node v, it is stored locally. The value $W_v$ is computed and if it has changed, the weights table is updated. If $W_{v\setminus u}$ (where u=parent(v)) changes as a result of the inserted item, an update message is sent to u indicating this change. This way at any instant a parent node will know if the weight of any of its child subtrees has changed. When u receives the update message from v, it updates the value of $W_{v\setminus u}$ in its weights table. The process of checking if the subtree weight $W_{u\setminus p}$ has changed is repeated at node u. The update message is propagated forward if the value of $W_{u\setminus p}$ changed. This propagation of updates stops at a node where the subtree weight did not change and does not need to be propagated to its parent (node p in FIG. 10). Thus, the update message is only sent to the parent of a node at which the item was inserted. There is no need to propagate this to child nodes, since the weight of their subtrees will not change as a result of inserted item at the parent node.

If the inserted item is the second highest priority item in the DPQ, the updates go all the way to the root. In case the inserted item has a higher priority than root, the updates go to the root and the root will issue a findRoot message to locate a new root. The findRoot travels from old root to v, flipping all the arrows in between. Hence the findRoot message always comes from a parent of a node and indicates that it needs to select a new parent. In this scenario, node v becomes the new root of the tree.

The insert operation on the DPQ consists of the following operations on different nodes: an insert operation on the node at which the item was inserted, and update or findRoot message processing at each node on which the update or findRoot reaches as a result of the insert. Although the insert operation on the DPQ is not atomic, the processing that takes place on individual nodes as a result of the insert operation on the DPQ, is considered atomic. Algorithm 1 contains the detailed pseudo-code for the insert operation at a node v.

---

Algorithm 1 insert operation on a node v

1: function insert(Item item, int itemWt)
2: Store item in local heap
3: if itemW$_t$ < Wv then
4: Wv ← itemWt
5: if v is not the root node then
6: compute $W_{v\setminus parent(v)}$
7: if $W_{v\setminus parent(v)}$ has changed then
8: send update(v, $W_{v\setminus parent(v)}$) to parent(v)
9: end if
10: end if
11: end if
12: end function Update Propagation A node v receives an update message from a node u when the weight $W_{u\backslash v}$ changes as a result of an insert or an update event. The main purposes of the update is to propagate any changes in the subtree weights to the parent node. The initial trigger for an update event is an insert operation. If the inserted item has a lower priority than the head, the root node does not change. Hence there is no change in the parent of v. In this case, if there is a change in subtree weight $W_{v\backslash parent(v)}$, the update is simply propagated to the parent of v.

If the inserted item has a higher priority than the head, the root of the tree will change, and this entails selecting a new parent node. However, the decision to select a new parent cannot be made at v when the update is coming from its child. This is because of the lazy update arrangement that allows a weight associated with the parent of v in node v's weights table to be stale. This value will only get updated when a findRoot message comes from the parent of v. Hence in this case also the update is forwarded to the parent node if the subtree weight $W_{v\backslash parent(v)}$ has changed. A new parent node is not selected at this time.

Algorithm 2 contains the detailed pseudo-code for the update message arrival at a node v from node u.

---
Algorithm 2 update message arrival at a node v from node u

1: function Msg update(Node u, Weight wt)
2: $W_{u\backslash v}$ ← wt
3: if v is root node then
4: if wt < $W_v$ then
5: parent(v) ← u
6: compute $W_{v\backslash u}$
7: send findRoot(v, $W_{v\backslash u}$) to u
8: end if
9: else
10: compute $W_{v\backslash parent(v)}$
11: if $W_{v\backslash parent(v)}$ has changed then
12: send update(v, $W_{v\backslash parent(v)}$) to parent(v)
13: end if
14: end if
15: end function
---

DeleteMin Operation

When a deleteMin is performed at a node other than the root, it is forwarded to the parent node. The deleteMin travels until it finds the root of the tree. At the root node, the head of the queue is removed from the local heap and sent back to the querying node. The findRoot process is started to select a new root.

Figure 11:
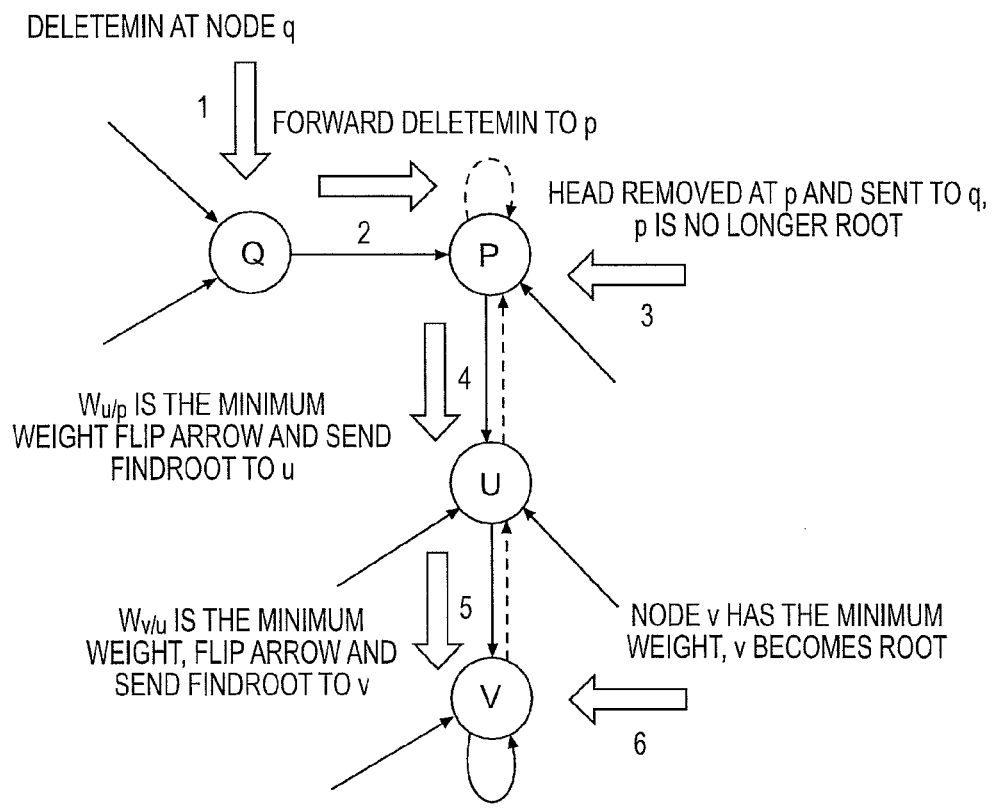
FIG. 11 is a tree structure illustrating update propagation during a deleteMin operation.

FIG. 11 shows the propagation of messages when the deleteMin operation is performed at node q. The message is forwarded to the parent of q which is the root node p. The head is deleted from p and returned back to q. After the deleteMin operation, the root node may stay as the root if it still has the highest priority item stored locally or there could be another node holding the highest priority item. In the latter case, new root has to be located. Here, the old root selects a new parent based on its weights table entries and sends a findRoot message to the new parent. In FIG. 10 after the head was deleted, $W_{u\backslash p}$ became the minimum weight in node p's weights table. Hence, it selects node u as the new parent and sends it a findRoot message along with the value of $W_{p\backslash u}$. The same process repeats at node u which selects v as the new parent. A findRoot message is sent from u to v containing the value of $W_{u\backslash v}$. The findRoot is propagated until a new root is located. In case of FIG. 11, node v realizes that it stores the head of the queue since, $W_v$ is the minimum value in its weights table. Node v marks itself as the root and the findRoot process stops.

As discussed above, the findRoot message flows from the old root towards a new root until the new root is reached. In FIG. 11, this flow is from node p to v. Other nodes that are not in this path are not updated with the weight of the new head. These nodes have stale parent entries in their weights table. Except the parent entry, all other entries in the table are current. These stale entries get updated eventually in later deleteMin operations when the head is stored in one of the subtrees of node having a stale parent weight. This "lazy update" technique cuts down on messaging and makes the queue administration process more efficient.

The deleteMin operation on the DPQ results in following operations on different nodes: the deleteMin propagating to the root node, the deleteMin operation being executed on the root node, the deleted item being sent to the node which queried for head of the DPQ, and findRoot message processing at each node where the findRoot message reaches as a result of the deleteMin being executed at the root node. Again as in case of the insert operation, the deleteMin operation on the DPQ is not atomic, however its local fragments that get executed on individual nodes are considered atomic. Algorithm 3 contains the detailed pseudo-code for the deleteMin operation at a node v.

---
Algorithm 3 deleteMin operation on a node v

1: function Item deleteMin( )
2: if parent(v) 6 = v then
3: return deleteMin( ) of parent(v)
4: else
5: if there are no items stored on node v, i.e. DPQ is empty then
6: return NULL
7: else
8: remove head i.e. item with weight $W_v$ from v
9: send head to querying node
10: if there are no items stored on node v then
11: $W_v$ ← $W_{max}$
12: else
13: compute new $W_v$
14: end if
15: if at least one entry in weights table 6 = Wmax i.e. DPQ is not then
16: parent(v) ← node with minimum weight in weights table
17: if parent(v) 6 = v then
18: Compute $W_{v\backslash parent(v)}$
19: send findRoot(v, $W_{v\backslash parent(v)}$) to parent(v)
20: end if
21: end if
22: end if
23: end if
24: end function
---

Finding New Root Node

A node v receives a findRoot message whenever there is a change of root as a result of head getting deleted or an item with a priority greater than the head is inserted in the DPQ. A findRoot always comes from the parent of v. On receipt of the findRoot a possible stale entry $W_{parent(v)\backslash v}$ is updated in v's weights table. The weights table is now current and is used to select a new parent. The findRoot is propagated to the new parent node along with the value $W_{v\backslash parent(v)}$. The findRoot process stops when a new root node is located. Algorithm 4 contains the detailed pseudo-code for the findRoot message arrival at a node v from node u.

Algorithm 4 findRoot message arrival at a node v from node u

1: function Msg findRoot(Node u, Weight wt)
2: $W_{u \setminus v} \leftarrow wt$
3: parent(v) · node with minimum weight in weights table
4: if parent(v) 6 = v then
5: compute $W_{v \setminus parent(v)}$
6: send findRoot(v, $W_{v \setminus parent(v)}$) to parent(v)
7: end if
8: end function Analysis of DPQ Administration
Handling Concurrent Requests Concurrent operations at various nodes may result in propagation of subtree weights to parent nodes and also in a change of parents for different nodes. However the process of changing parents at different nodes occurs sequentially as the findRoot message travels from one node to another. These concurrent operations do not affect the ability of the process to find a root that stores the head. The process relies on two assumptions to handle concurrent requests. The first assumption is that operations, such as insert, deleteMin, update, or findRoot, that get executed on individual nodes are atomic and cannot be interrupted. The other assumption is that there is a FIFO communication channel between any two adjacent nodes. This assumption helps in sequencing operations and their behavior at any given node.

The following lemmas and theorems provide further information regarding the operation of the present system.

Lemma 6.1: At any instant, there will be at most one root in the system.

Proof: Initially since the process starts with a rooted tree, there exists only one root node. From the insert and deleteMin operations, it can be concluded that the only instance at which a node can chose its parent is if it is a root node, or if it receives a findRoot from its parent. The former case results in a state where findRoot has started and at that instance there is no root in the system. There can be only one findRoot in the system because only the root node can start that operation. Any concurrent operations that reach the old root (or other nodes in the path) would follow the findRoot. The findRoot results in either a node selecting itself as the root and stopping the propagation or in selecting its parent and propagating findRoot to its new parent. In the former case, there will be exactly one new root and no findRoot operation in the system, and in the later case there will be no root with exactly one findRoot in the system. A findRoot travels through the tree computing new parent and sending a findRoot message to the new parent.

The following lemma states that findRoot is deterministic and an immediate consequence of the lemma is that findRoot avoids cycles.

Lemma 6.2: The operation findRoot at any node results in a new root.

Proof: Consider a node v receiving findRoot from its parent u, along with the subtree weight of u ($W_{u \setminus v}$). For this findRoot to flow from u to v, u's weights table should show $W_{v \setminus u} < W_{u \setminus v}$. This implies that the node selected in step 3 of Algorithm 4 cannot be u.

Lemma 6.3: All operations that need to reach the root node will be able to find it.

Proof: Consider two concurrent operations $O_1$ and $O_2$ that need to reach the root node. Let the path for $O_1$ be $(v_1, \ldots v_r)$ and $O_2$ be $(v_2, \ldots v_r)$. Without loss of generality, consider that the operation $O_1$ travels through nodes $(v_1, \ldots v_r)$ and reaches the root node vr first. If $O_1$ does not cause a change in the root node, $O_2$ can reach the root node through previously defined path. If $O_1$ causes the root node to change, then from lemma 6.1 and 6.2 we know that there will be a new root $v'_r$, and findRoot will travel from $(v_r, \ldots v'_r)$ flipping the arrows. In this case, there will be at least one node, $v_x$ in the set $\{v_2, \ldots v_r\}$ from which there exists a directed path to reach the new root $v'_r$.

During concurrent deleteMin operations, the operation that reaches the root node first, executes first. The remaining deleteMin operations follow the findRoot message. As soon as a new root is located by the findRoot message, the next deleteMin operation, which is immediately trailing the findRoot, gets executed. This might result in a new findRoot message, and the sequence continues. Although with each deleteMin execution, the overall system continues to make progress, there could be situations where newly entered deleteMin operations in the system continue to overtake the pending ones. For example in FIG. 2, this could happen if the root node keeps switching between nodes b and e, and every time a findRoot message passes the node d, new deleteMin operations are performed at node d. This might cause new deleteMin operations to get added before the older ones which are following the findRoot and hence preventing their chance to execute. In this case although the process ensures low-level fairness, high-level fairness is not guaranteed. For some applications, this high-level fairness although desirable, may not be as critical. In our distributed call center example, as long as the work items get processed, it is not critical if some agents do not get a chance to execute work items. The agent application can wait until the contention for work items subsides. This issue could be minimized by queuing the new deleteMin operations on the node where they originate until any pending deleteMin operation for that node completes (i.e. it receives the head).

Lemma 6.4: The insert and deleteMin operations preserve the node invariant listed in Equation 1 at each node.

Proof: The proof of this lemma follows directly from the insert and deleteMin processing of the process. Consider both the insert and deleteMin operations. When an item gets inserted at node v, the insert operation computes the value $W_{v \setminus parent(v)}$ as the minimum of $W_v$ and weights reported from all the children of node v which are stored in v's weights table (steps 4 and 6 of Algorithm 1) and if $W_{v \setminus parent(v)}$ has changed, sends this value to its parent (step 8 of Algorithm 1). On receiving an update message, parent of v follows the same processing (steps 2, 9 and 11 of Algorithm 2). This ensures that each node in its weights table has the minimum reported subtree weight of its children. For the deleteMin operation, when a deleteMin operation reaches a root node r, if a new parent is selected, it is chosen by finding the minimum weighted entry in r's weights table (step 16 of Algorithm 3). The parent of r is sent the value $W_{r \setminus parent(r)}$ as the minimum of $W_r$ and weights reported from all the children of node r which are stored in r's weights table (steps 13, 18 and 19 of Algorithm 3). When a findRoot message reaches the parent of r, the same process is repeated (steps 3, 5 and 6 of Algorithm 4). The above steps help ensure that each node in a weights table has the minimum reported subtree weight of its children.

Lemma 6.5: For a rooted tree T, if r is the root of T, then r has the highest priority item amongst a set of items that are in the DPQ as a result of all the completed operations.

Proof: Each node selects a parent which corresponds to the minimum weight in the weights table at that node. Hence the direction to the parent points towards the highest priority item in the DPQ. Using the result from lemma 6.4 and applying it inductively starting from leaf nodes to the root node in the spanning tree proves this lemma.

Theorem 6.6: The deleteMin operation always returns the highest priority item amongst a set of items that are in the DPQ as a result of all the operations that completed before the execution of deleteMin at the root node.

Proof: From lemma 6.3, it is clear that a deleteMin operation will always reach a root node. Combining this result with Lemma 6.5 proves this theorem. A special case of this theorem is that when there are no pending operations, a deleteMin returns the highest priority item stored in the system. Theorem 6.6 proves that QPID implements a DPQ.

Complexity

The following description presents the worst case time complexity analysis for the above-described processes. It does not include the cost of building the initial rooted spanning tree. The cost of insert and deleteMin operations on the is computed in terms of parameters indicated in Table 2.

TABLE 2

| | |
|---|---|
| k = | number of items in the DPQ |
| d = | maximum degree of a vertex in the tree |
| n = | number of vertices in the tree |
| h = | maximum depth of the tree |

Note that this analysis does not include the case when there are several pending concurrent operations. First consider the computational cost of findRoot and update processing on a single node. When calculating the costs of insert and deleteMin operations, one should include the total cost of a worst-case update or findRoot propagation.

The findRoot and Update Processing Complexity

In case of findRoot, step 2 of Algorithm 4 modifies the weights table at a node. If the weights table is stored in the form of a heap, the cost of updating a weights table with d entries is $O(\log(d))$. Computing the second smallest weight in the weights table (step 5) is $O(1)$. Leaving aside the propagation of the findRoot, the rest of the steps in algorithm 4 are constant time operations. Hence, the total cost of findRoot processing at a single node is $O(\log(d))$. For update, the cost of step 2 of Algorithm 2 is $O(\log(d))$. The cost of steps 6 and 10 is $O(1)$. Leaving aside the propagation of update and findRoot, the total cost of update at a single node is $O(\log(d))$.

The insert Operation Complexity

Given a DPQ with k items, the worst case cost of storing an inserted item in a local heap (step 2 in Algorithm 1) is $O(\log(k))$. The cost of steps 4 and 6 is $O(\log(d))$ and $O(1)$ respectively. Under worst case scenario, the update and findRoot propagation combined can travel twice the depth of the tree. Therefore the cost of step 8 is $O(h \log(d))$. All other steps in algorithm 1 are constant time operations. Hence the total worst case cost of an insert operation can be $O(\log(k)+h \log(d))$.

The deleteMin Operation Complexity

Finding the root node (step 3 in Algorithm 3) in worst case costs $O(h)$. Assuming all the items are at the root node, deleting an item from local heap at the root (step 8) will cost $O(\log(k))$. The findRoot message (step 19) in the worst case could cover the depth of the tree and has cost of $O(h \log(d))$. Hence, the total worst case cost of a deleteMin operation could be $O(\log(k)+h \log(d))$. From the above analysis it is clear that when selecting a spanning tree, the balancing between the depth of the tree and the degree of vertices is important. For a balanced d-ary tree, the cost of insert and deleteMin operations reduces to $O(\log(k))$. For a regular FIFO DPQ, the insert update message might need to cover just a couple nodes instead of the worst case scenario of traveling the entire depth of the tree.

The present invention has been discussed herein in terms of several presently preferred embodiments. Various additions and modifications to these embodiments will become apparent to those of ordinary skill in this field upon a reading of the foregoing description. It is intended that all such additions and modifications comprise a part of the present invention to the extent they fall within the scope of the several claims appended hereto.

We claim:

1. A method of administering a distributed priority queue structure, the distributed priority queue structure comprising a tree having nodes storing one or more data items having a priority, one of the nodes storing a data item with a highest priority in the tree comprising a current root node, at least one pointer pointing to the current root node, each node connected directly to a given node comprising a subtree node of the given node, and all nodes connected to the given node through the subtree node comprising a subtree of the given node, the method comprising:

removing the highest priority item from the current root node to create a temporary root node;

determining for each subtree connected to the temporary root node a subtree priority comprising the priority of the highest priority data item in the each subtree;

determining as the highest priority subtree connected to the temporary root node the subtree connected to the temporary root node having the highest subtree priority;

determining whether any of the one or more data items stored at the temporary root node has a higher priority than the highest subtree priority;

if any of the one or more data items stored at the temporary root node has a priority higher than the highest subtree priority, defining the temporary root node as the current root node; and if none of the one or more data items stored at the temporary root node has a priority higher than the highest subtree priority, changing the direction of the pointer between the temporary root node and the highest priority subtree to point to the subtree node of the highest priority subtree, and defining the subtree node of the highest priority subtree as the new temporary root node.

2. The method of claim 1 wherein the new temporary root node includes at least one subtree node connected to the new temporary root node and including the additional steps of:

a) determining for each subtree connected to the new temporary root node a subtree priority comprising the priority of the highest priority data item in the each subtree connected to the new temporary root node;

b) determining a highest priority subtree connected to the new temporary root node, c) if any of the one or more data items stored at the new temporary root node has a priority higher than the priority of the highest priority subtree connected to the new temporary root node, defining the new temporary root node as the current root node; and d) if none of the one or more data items stored at the new temporary root node has a priority higher than the priority of the highest priority subtree connected to the new temporary root node, changing the direction of the pointer between the new temporary root node and the highest priority subtree connected to the new temporary root node to point to the highest priority subtree connected to the new temporary root node and defining the subtree node of the highest priority subtree connected to the new temporary root node as the new temporary root node.

3. The method of claim 2 including the additional step of performing steps a-d until the step c is satisfied.

4. The method of claim 1 including the additional step of storing a list of subtree weights for each subtree in the tree.

5. The method of claim 1 including the additional step of storing, for each node in the tree, a list of the subtree priorities of each subtree connected to said each node in the tree.

6. The method of claim 5 including the additional step of inserting a new data item into a particular node.

7. The method of claim 6 including the additional step of updating at least some of the subtree priorities after the step of inserting a new data item into a particular node.

8. The method of claim 7 wherein said step of updating at least some of the subtree priorities comprises orienting a pointer at the particular node to point to the highest priority subtree connected to the particular node.

9. The method of claim 2 including the additional step of, when the new temporary root node is defined as the current root, directing a pointer from the current root node to the current root node.

10. The method of claim 1 wherein said nodes comprise agents in a call center.

11. The method of claim 10 wherein said data items comprise data related to telephone calls.

12. The method of claim 11 wherein priority comprises a time that a given data item was received at a given node.

13. A method of administering a distributed priority queue structure, the distributed priority queue structure comprising a tree having nodes storing one or more data items having a priority; each node connected directly to a given node being a subtree node of the given node, and all nodes connected to the given node through the subtree node being a subtree of the given node, wherein the priority of a given subtree comprises the priority of the highest priority data item stored on a node in the given subtree, the method comprising:
for a first node, providing a pointer pointing to a subtree node of a subtree of the first node, the subtree node of the subtree of the first node having a higher priority than the priorities of the one or more data items stored at the first node;
for a second node, providing a pointer pointing to a subtree node of a subtree of the second node, the subtree node of the second node having a higher priority than the priorities of the one or more data items stored at the second node; and
if no subtree connected to the first node has a priority higher than the priorities of the one or more data items stored at the first node, defining the first node as the root node.

14. The method of claim 13 including the additional step of:
a) for a next node, providing a pointer pointing to a subtree node of a subtree of the next node, the subtree node of the next node having a higher priority than the priorities of the one or more data items stored at the next node; and
b) if no subtree connected to the next node has a priority higher than the priorities of the one or more data items stored at the next node, defining the next node as the root node.

15. The method of claim 14 including the additional step of repeating steps a and b until step b is satisfied.

16. The method of claim 14 including the additional step of storing a list of subtree weights for each subtree in the tree.

17. The method of claim 14 including the additional step of storing, for each node in the tree, a list of the subtree priorities of each subtree connected to said each node in the tree.

18. The method of claim 14 including the additional step of inserting a new data item into a particular node.

19. The method of claim 18 including the additional step of updating at least some of the subtree priorities after the step of inserting a new data item into a particular node.

20. The method of claim 19 wherein said step of updating at least some of the subtree priorities comprises orienting a pointer at the particular node to point to the highest priority subtree connected to the particular node.

21. A computer configured for administering a distributed priority queue structure, the distributed priority queue structure comprising a tree having nodes storing one or more data items having a priority, one of the nodes storing a data item with a highest priority in the tree comprising a current root node, a plurality of pointers pointing from a first node to a second node or from the first node to the first node, each node connected directly to a given node comprising a subtree node of the given node, and all nodes connected to the given node through the subtree node comprising a subtree of the given node, the computer comprising:
computer memory storing a weight table storing weights for each subtree of each node in the tree;
means for changing the direction of the plurality of pointers;
means for removing the highest priority data item from the tree;
means for inserting a new data item into the tree; and
means for updating the weight table when the highest priority item is removed from the tree and when a new data item is inserted into the tree.

22. The apparatus of claim 21 wherein said nodes comprise agents in a call center.

23. The apparatus of claim 22 wherein said data items comprise data related to telephone calls.

24. The apparatus of claim 23 wherein the priority comprises a time that a given data item was received at a given node.

25. A non-transitory computer readable recording medium storing a program for causing a computer to perform a method of administering a distributed priority queue structure, the distributed priority queue structure comprising a tree having nodes storing one or more data items having a priority, one of the nodes storing a data item with a highest priority in the tree comprising a current root node, at least one pointer pointing to the current root node, each node connected directly to a given node comprising a subtree node of the given node, and all nodes connected to the given node through the subtree node comprising a subtree of the given node, the method comprising:
removing the highest priority item from the current root node to create a temporary root node;
determining for each subtree connected to the temporary root node a subtree priority comprising the priority of the highest priority data item in the each subtree;
determining as the highest priority subtree connected to the temporary root node the subtree connected to the temporary root node having the highest subtree priority;
determining whether any of the one or more data items stored at the temporary root node has a higher priority than the highest subtree priority;
if any of the one or more data items stored at the temporary root node has a priority higher than the highest subtree priority, defining the temporary root node as the current root node; and
if none of the one or more data items stored at the temporary root node has a priority higher than the highest subtree priority, changing the direction of the pointer between the temporary root node and the highest priority subtree to point to the subtree node of the highest priority subtree, and defining the subtree node of the highest priority subtree as the new temporary root node.

26. A method of administering a distributed priority queue structure, the distributed priority queue structure comprising a tree having nodes, the nodes comprising servers at which telephone calls are received, the nodes storing one or telephone calls having a priority, one of the nodes storing a telephone call with a highest priority in the tree comprising a current root node, at least one pointer pointing to the current root node, each node connected directly to a given node comprising a subtree node of the given node, and all nodes connected to the given node through the subtree node comprising a subtree of the given node, the method comprising:

answering the highest priority telephone call and removing the highest priority telephone call from the current root node to create a temporary root node;

determining for each subtree connected to the temporary root node a subtree priority comprising the priority of the highest priority telephone call in the each subtree;

determining as the highest priority subtree connected to the temporary root node the subtree connected to the temporary root node having the highest subtree priority;

determining whether any of the one or more telephone calls stored at the temporary root node has a higher priority than the highest subtree priority;

if any of the one or more telephone calls stored at the temporary root node has a priority higher than the highest subtree priority, defining the temporary root node as the current root node; and if none of the one or more telephone calls stored at the temporary root node has a priority higher than the highest subtree priority, changing the direction of the pointer between the temporary root node and the highest priority subtree to point to the subtree node of the highest priority subtree, and defining the subtree node of the highest priority subtree as the new temporary root node.

27. The method of claim 13, wherein the nodes comprise servers at which telephone calls are received.

\* \* \* \* \*